United States Patent
Spinelli et al.

(10) Patent No.: US 11,645,844 B2
(45) Date of Patent: May 9, 2023

(54) COMPUTING DEVICES PROGRAMMED TO DETECT SLIPPERY SURFACES WITHIN ENCLOSURES AND METHODS/SYSTEMS OF USED THEREOF

(71) Applicant: RS1 Worklete, LLC, Denver, CO (US)

(72) Inventors: Michael Patrick Spinelli, Croton, NY (US); SivaSankara Reddy Bommireddy, Secaucus, NJ (US); Jenna Stephenson, Brooklyn, NY (US)

(73) Assignee: RS1 Worklete, LLC, Denver, CO (US)

( * ) Notice: Subject to any disclaimer, the term of this patent is extended or adjusted under 35 U.S.C. 154(b) by 0 days.

(21) Appl. No.: 17/957,041

(22) Filed: Sep. 30, 2022

(65) Prior Publication Data

US 2023/0105173 A1    Apr. 6, 2023

Related U.S. Application Data

(60) Provisional application No. 63/252,462, filed on Oct. 5, 2021.

(51) Int. Cl.
| | |
|---|---|
| *G06V 20/40* | (2022.01) |
| *G06V 10/141* | (2022.01) |
| *G06V 10/764* | (2022.01) |

(52) U.S. Cl.
CPC ............ *G06V 20/44* (2022.01); *G06V 10/141* (2022.01); *G06V 10/764* (2022.01); *G06V 20/41* (2022.01)

(58) Field of Classification Search
CPC ...... G06V 20/44; G06V 10/141; G06V 20/41; G06V 10/764
See application file for complete search history.

(56) References Cited

U.S. PATENT DOCUMENTS

| | | | | |
|---|---|---|---|---|
| 6,812,846 | B2 * | 11/2004 | Gutta | G06T 7/97 340/603 |
| 7,941,952 | B1 * | 5/2011 | Corbean | G09F 15/0062 116/63 P |
| 9,594,964 | B2 * | 3/2017 | Zhao | G06V 20/56 |
| 9,987,752 | B2 * | 6/2018 | Fisher | G06V 20/20 |
| 11,498,537 | B1 * | 11/2022 | Gaudin | G06T 7/41 |
| 2003/0063006 | A1 * | 4/2003 | Gutta | G08B 13/19602 340/603 |
| 2011/0178635 | A1 * | 7/2011 | Anderson | E01H 1/00 700/253 |
| 2014/0168427 | A1 * | 6/2014 | Argue | G06V 20/52 382/103 |
| 2017/0355081 | A1 * | 12/2017 | Fisher | H04N 5/33 |

(Continued)

*Primary Examiner* — Utpal D Shah
(74) *Attorney, Agent, or Firm* — Neugeboren O'Dowd PC

(57) ABSTRACT

According to some embodiments, disclosed are systems and methods for machine learning-based image detection and the determination of slippery conditions based therefrom. The disclosed systems and method identify a set of images that depict captured imagery in relation to at least one area of a floor at a location. These images are then analyzed via at least one slippery condition detection machine learning algorithm, which results in a determination of a classification of the area of the floor (e.g., does a puddle exist or other type of slippery condition). This information is stored and later used for training of the at least one slippery condition detection machine learning algorithm. Moreover, the information is communicated to beacons in/around the location, to alert users to the condition.

20 Claims, 5 Drawing Sheets

(56) References Cited

U.S. PATENT DOCUMENTS

| | | | |
|---|---|---|---|
| 2018/0233018 A1* | 8/2018 | Burwinkel | A61B 5/1117 |
| 2018/0304898 A1* | 10/2018 | Yoshikawa | G06V 10/143 |
| 2019/0235511 A1* | 8/2019 | Tiwari | G06V 20/10 |
| 2019/0250630 A1* | 8/2019 | Zhao | G06T 7/73 |
| 2020/0009732 A1* | 1/2020 | Gordon | G08B 21/24 |
| 2020/0250774 A1* | 8/2020 | Agarwal | G06N 5/045 |
| 2020/0348183 A1* | 11/2020 | Agarwal | G06V 20/52 |
| 2021/0001480 A1* | 1/2021 | Artes | B25J 9/16 |
| 2022/0319177 A1* | 10/2022 | Ruiz-Garcia | G06T 7/194 |

* cited by examiner

COMPUTING DEVICES PROGRAMMED TO DETECT SLIPPERY SURFACES WITHIN ENCLOSURES AND METHODS/SYSTEMS OF USED THEREOF

CROSS-REFERENCE TO RELATED APPLICATIONS

This application claims the benefit of priority from U.S. Provisional Patent Application No. 63/252,462, filed Oct. 5, 2021, which is incorporated herein by reference in its entirety.

FIELD OF TECHNOLOGY

The present disclosure generally relates to computer-based systems configured for computing devices programmed to detect slippery surfaces within enclosures and methods/systems of used thereof, including machine learning-based image detection for conditions in a location and methods of use thereof.

BACKGROUND OF TECHNOLOGY

Reducing the number of slips, trips, and falls in a facility is an important health and safety task in social, community and workplace areas. Surfaces, such as floors that have puddles/spilled liquids and/or other slip hazards pose a risk to the health and safety of people in an area. "27% of the 888,220 nonfatal work injuries resulting in days away from work in 2019 were related to slips, trips, and falls", according to the CDC.

SUMMARY

Some embodiments described herein include a system for machine learning-based image detection and the determination of slippery conditions based therefrom. The system includes: a plurality of cameras, positioned within an enclosure above a floor of the enclosure; a plurality of communication beacons, positioned within the enclosure; a first computing device, including: a non-transient computer memory, storing software instructions; at least one processor, where, when the at least one processor executes the software instructions, the at least one processor is programmed to: iteratively receive, during a plurality of time periods, a plurality of floor visual inputs from the plurality of cameras, where the plurality of floor visual inputs includes each plurality of particular images capturing each particular area of the floor from at least two different angles; iteratively execute at least one slippery condition detection machine learning algorithm to process a combined visual input of the plurality of floor visual inputs to classify each particular area of the floor, associated with the plurality of particular images, into: a slippery condition category or a non-slippery condition category to form a non-slippery condition database of floor visual inputs; iteratively store a plurality of particular images into a slippery condition database of floor visual inputs when a particular area of the floor, corresponding to the plurality of particular images, is classified into the slippery condition category; iteratively store the plurality of particular images into a non-slippery condition database of floor visual inputs when the particular area of the floor, corresponding to the plurality of particular images, is classified into the non-slippery condition category; for each particular area in the slippery condition category: iteratively label each predicted location of each slippery condition within each particular area of the floor within the plurality of floor visual inputs; iteratively instruct at least one beacon of the plurality of beacons to transmit, to at least one second computing device associated with at least one user, at least one instruction to display on the at least one second computing device a graphical user interface, including: at least one image of each particular area with each predicted location of each slippery condition and at least one graphical user element requesting the at least one user to confirm a presence or an absence of each slippery condition at each predicted location of each particular area of the floor; iteratively receive a plurality of user feedback inputs, identifying the presence or the absence of each slippery condition at each predicted location of each particular area of the floor; and iteratively train the at least one slippery condition detection machine learning algorithm to obtain at least one trained slippery condition detection machine learning algorithm, based at least in part on: the slippery condition database of floor visual inputs, the non-slippery condition database of floor visual inputs, and the plurality of feedback inputs, identifying the presence or the absence of each slippery condition at each predicted location of each particular area of the floor.

Some embodiments described herein include a method for machine learning-based image detection and the determination of slippery conditions based therefrom. According to some embodiments, a method is disclosed, which includes: iteratively receiving, by a device, during a plurality of time periods, a plurality of floor visual inputs from the plurality of cameras, where the plurality of floor visual inputs includes each plurality of particular images capturing each particular area of the floor from at least two different angles; iteratively executing, by the device, at least one slippery condition detection machine learning algorithm to process a combined visual input of the plurality of floor visual inputs to classify each particular area of the floor, associated with the plurality of particular images, into: a slippery condition category, or a non-slippery condition category to form a non-slippery condition database of floor visual inputs; iteratively storing, by the device, a plurality of particular images into a slippery condition database of floor visual inputs when a particular area of the floor, corresponding to the plurality of particular images, is classified into the slippery condition category; iteratively storing, by the device, the plurality of particular images into a non-slippery condition database of floor visual inputs when the particular area of the floor, corresponding to the plurality of particular images, is classified into the non-slippery condition category; for each particular area in the slippery condition category: iteratively labelling, by the device, each predicted location of each slippery condition within each particular area of the floor within the plurality of floor visual inputs; iteratively instructing, by the device, at least one beacon of the plurality of beacons to transmit, to at least one second computing device associated with at least one user, at least one instruction to display on the at least one second computing device a graphical user interface, including: at least one image of each particular area with each predicted location of each slippery condition, and at least one graphical user element requesting the at least one user to confirm a presence or an absence of each slippery condition at each predicted location of each particular area of the floor; iteratively receiving, by the device, a plurality of user feedback inputs, identifying the presence or the absence of each slippery condition at each predicted location of each particular area of the floor; and iteratively training, by the device, the at least one slippery condition detection machine learning algorithm to obtain at least one trained slippery condition detection machine learning algorithm, based at least in part on: the slippery condition database of floor visual inputs, the non-slippery condition database of floor visual inputs, and the plurality of feedback inputs, identifying the presence or the absence of each slippery condition at each predicted location of each particular area of the floor.

Some embodiments of one or more systems and/or methods for performing dynamic optimized activity-assignment processing further include where each camera of the plurality of cameras is programed to adjust an operation of at least one light source so as to result in the light intensity of the light in the particular area of the enclosure that is equal to or exceeds the predetermined threshold value.

Some embodiments of one or more systems and/or methods for performing dynamic optimized activity-assignment processing further include where the at least one light source is incorporated into a respective camera of the plurality of cameras.

Some embodiments of one or more systems and/or methods for performing dynamic optimized activity-assignment processing further include where, when the at least one processor executes the software instructions, the at least one processor is further programmed to determine an extent of each slippery condition for each predicted location of each slippery condition within each particular area based at least in part on pixel intensity of pixels found within at least one part of the at least one image corresponding to each predicted location of each slippery condition in each particular area.

Some embodiments of one or more systems and/or methods for performing dynamic optimized activity-assignment processing further include where, when the at least one processor executes the software instructions, the at least one processor is further programmed to rank each predicted location of each slippery condition based on the extent of the slippery condition to generate a ranked list of predicted slippery condition locations.

Some embodiments of one or more systems and/or methods for performing dynamic optimized activity-assignment processing further include where, when the at least one processor executes the software instructions, the at least one processor is further programmed to iteratively instruct, based on the ranked list of predicted slippery condition locations, the at least one beacon of the plurality of beacons to transmit, to the at least one second computing device associated with the at least one user, the at least one instruction to display on the at least one second computing device the graphical user interface.

Some embodiments of one or more systems and/or methods for performing dynamic optimized activity-assignment processing further include: at least one motion detection sensor; where each camera of the plurality of cameras is further programed to acquire the visual input when the at least one motion detection sensor has been activated; where, when the executes the software instructions, the at least one processor is further programmed to identify, from the visual input, at least one slippery condition-related negative movement event associated with at least one predicted location of at least one slippery condition at least one area of the floor; and generate at least one metric that is related to the at least one slippery condition-related negative movement event.

Some embodiments of one or more systems and/or methods for performing dynamic optimized activity-assignment processing further include where the at least one slippery condition-related negative movement event is a slip.

Some embodiments of one or more systems and/or methods for performing dynamic optimized activity-assignment processing further include where the at least one slippery condition-related negative movement event is a fall.

Some embodiments of one or more systems and/or methods for performing dynamic optimized activity-assignment processing further include where the enclosure is a warehouse.

Some embodiments of one or more systems and/or methods for performing dynamic optimized activity-assignment processing further include where each camera of the plurality of cameras includes at least one particular light sensor that is configured to measure a light intensity of a light in a particular area of the enclosure where a particular camera is positioned.

Some embodiments of one or more systems and/or methods for performing dynamic optimized activity-assignment processing further include where each camera of the plurality of cameras is programed to acquire a visual input when the light intensity of the light in the particular area of the enclosure is equal to or exceeds a predetermined threshold value corresponding a sufficient amount of light intensity to recognize a particular slippery condition on the floor.

Some embodiments of one or more systems and/or methods for performing dynamic optimized activity-assignment processing further include where, when the at least one processor executes the software instructions, the at least one processor is further programmed to: iteratively receive, during the plurality of time periods, the plurality of floor visual inputs from the plurality of cameras when the light intensity detected by each light sensor associated with each camera is of the sufficient amount to recognize a particular slippery condition on the floor.

Some embodiments of one or more systems and/or methods for performing dynamic optimized activity-assignment processing further include where, when the at least one processor executes the software instructions, the at least one processor is further programmed to: determine at least one pixel intensity associated with at least one pixel of the plurality of floor visual inputs from the plurality of cameras; and iteratively receive, during the plurality of time periods, the plurality of floor visual inputs from the plurality of cameras when the light intensity detected by each light sensor associated with each camera is of the sufficient amount to recognize a particular slippery condition on the floor.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1A:
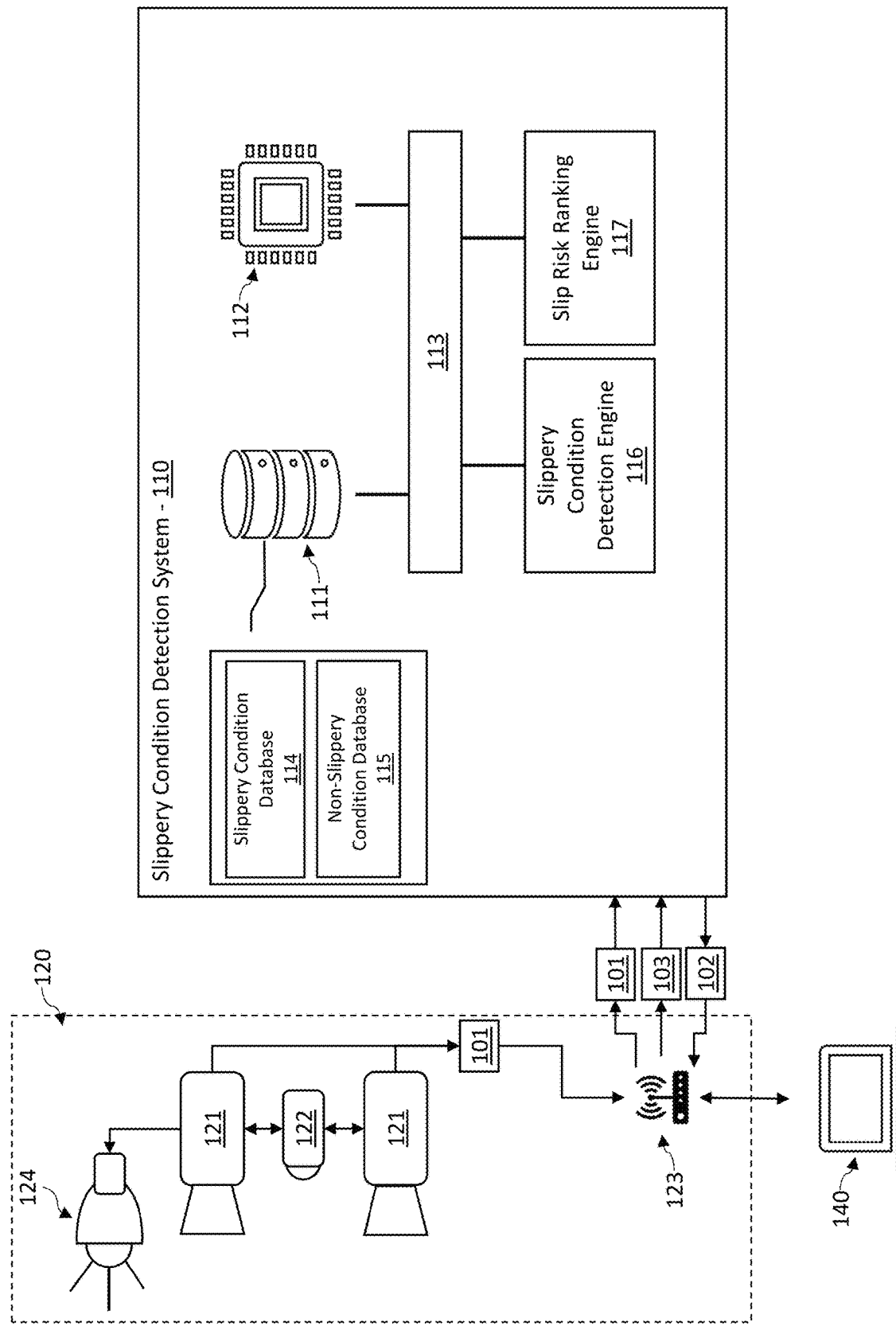
FIG. 1A is a block diagram of an exemplary computer-based system and platform automated machine learning-based slip risk conditions using image data of a location in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 5 illustrate systems and methods of automated detection of slippery surfaces using machine learning based techniques and multiple camera angles in order to warning users. The following embodiments provide technical solutions and technical improvements that overcome technical problems, drawbacks and/or deficiencies in the technical fields involving a lack of automated ability to forewarn people of hazardous surface conditions, such as slippery materials and/or substances, as well as deficiencies in computer visions techniques involving glare, discoloration, shadowing and other image features that obscure the ability to identify slippery surfaces. As explained in more detail, below, technical solutions and technical improvements herein include aspects of improved systems for detecting hazardous surface conditions of walking surfaces including slippery conditions, materials and/or substances to warn users of the hazardous conditions, where improvements include features such as multiple camera angles, automated lighting changes, motion detection and other technical features for improving computer visions tasks to detect slippery conditions of a surface. Based on such technical features, further technical benefits become available to users and operators of these systems and methods. Moreover, various practical applications of the disclosed technology are also described, which provide further practical benefits to users and operators that are also new and useful improvements in the art.

In some embodiments, the detection of a slip hazard, such as a slippery condition of a surface, occurs using machine vision cameras placed strategically around the facility. These cameras are linked to beacons that can alert managers in real time to where the spill has occurred. The device where the manager receives the spill alert allows the manager to proceed with either cleaning the spill or checking the area and reporting back to the device that it was a false positive. This allows the algorithm to constantly learn as it receives feedback from multiple users in many settings. As it becomes more widely adopted, more spill images will be collected to make the algorithm more accurate.

Figure 4:
FIG. 4 depicts an example image frames from different angles of a wet floor to illustrate the technical advantages of multiple camera angles in accordance with one or more embodiments of the present disclosure.
Figure 4:

The uniqueness from this disclosure stems from the fact it uses cameras at multiple angles to detect a puddle and uses a light to help in lower lit conditions (because of the lack of natural light in a warehouse). The importance of multiple angles is illustrated in FIG. 4 where a puddle taken from two different angles appears wildly different. FIG. 5 shows a flow chart of the steps taken by the camera monitoring system. Unlike a car puddle detection system, the cameras may collect data one a periodic basis on the order of, e.g., seconds, minutes, tens of minutes, hours, etc. The user can confirm or deny that the slip risk condition actually exists, which helps the detection algorithm improve in the future.

In some embodiments, a slippery surface may include any surface condition that result in the surface being difficult to hold firmly or stand on because it is smooth, wet, and/or slimy. A list of non-limiting possible surfaces are listed below in Table 1.

TABLE 1

Examples of slippery and non-slippery surface conditions

| Slippery Surface | Non-slippery hazards |
| --- | --- |
| Any liquid, defined as a substance that flows freely but is of constant volume, having a consistency like that of water or oil (examples include water, oils, lubricants, gas, etc.) | Objects that are not liquid (examples include one or more rocks, banana peel, rope, wet paper towels, etc.) |
| Dusts, granules or particulars that have accumulated on a floor | Plastic covering on a floor |
| Mud, ice, snow, rain | |

Figure 1B:
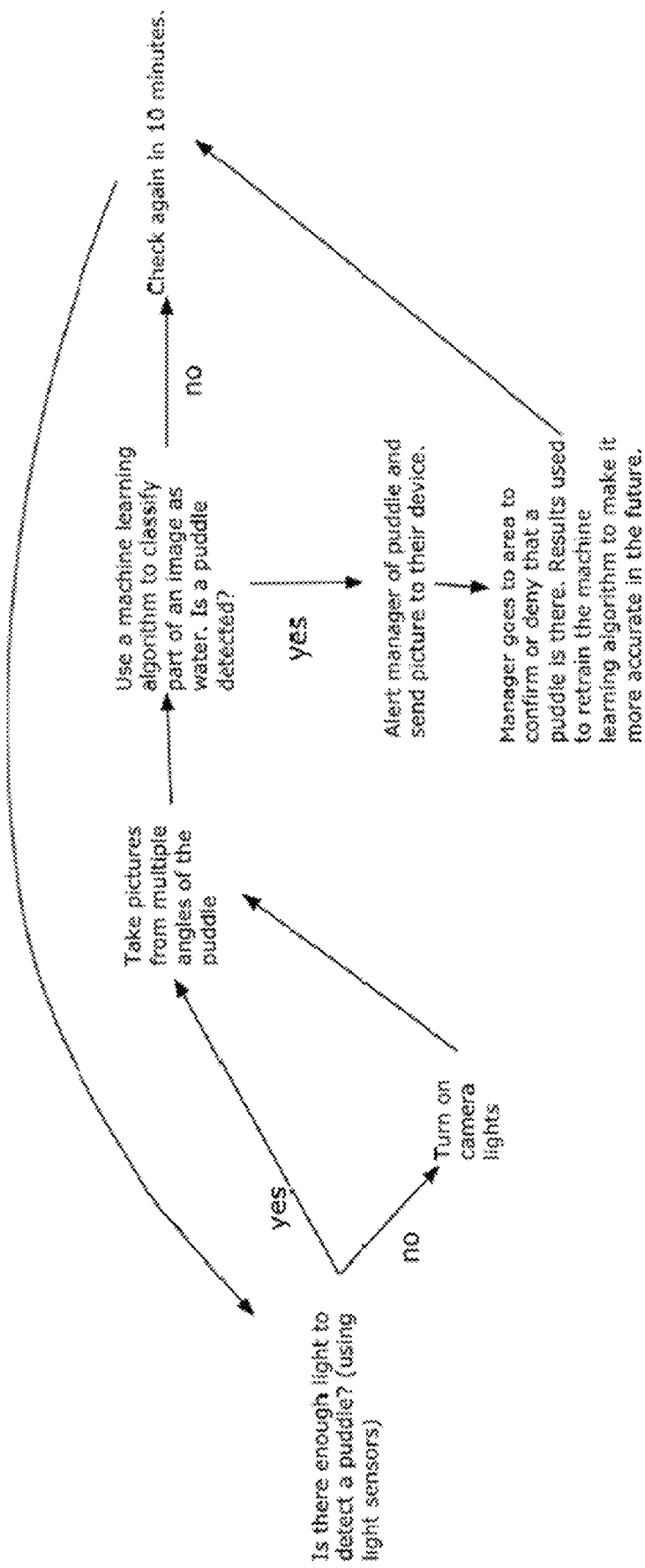
FIG. 1B illustrates a flowchart of an illustrative methodology of automated machine learning-based slip risk conditions using image data of a location in accordance with one or more embodiments of the present disclosure.

FIG. 1A is a block diagram of an exemplary computer-based system and platform automated machine learning-based slip risk conditions using image data of a location in accordance with one or more embodiments of the present disclosure. FIG. 1B illustrates a flowchart of an illustrative methodology of automated machine learning-based slip risk conditions using image data of a location in accordance with one or more embodiments of the present disclosure.

In some embodiments, a slippery condition detection system 110 is connected to cameras 121 in a location 120 of facility or other enclosure, such as, e.g., a warehouse, building, office, garage, healthcare facility, home, etc. In some embodiments, the cameras 121 in the location 120 may include multiple cameras 121 set at different mounting points with different view angles within the location 120. Thus, each camera 121 may provide a different view of the location 120 for a different angle or perspective of each point on a surface, such as a floor, ground or other walking surface within the location 120. In some embodiments, to improve the view of each camera 121, the location 120 may include one or more light sources 124, such as, e.g., ceiling lighting, drop lighting, lamps, among other light sources 124 or any combination thereof.

In some embodiments, the different views of each camera 121 may be determined iteratively by automated and/or manual adjustment. In some embodiments, each camera 121 may be assigned to the particular location 120 and to particular area(s) of a floor or other surface within the location 120. Thus, each camera 121 may be adjusted to ensure that each camera 121 of the location 120 is directed to the particular area(s) to provide the different views. In some embodiments, the cameras 121 may be mounted on adjustable mounts to allow for manual or automated adjustment of each camera 121. In some embodiments, the adjustable mount or each camera 121 may include one or more ball joints, hinges, articulated members, tripods, wall plates, or other fixed or mobile mounting points with suitable attachment mechanisms.

In some embodiments, the adjustable mount of each camera 121 may include a motorized mount for automated adjustment of each camera 121. In some embodiments, each camera 121 in the location 120 may be interconnected to exchange data of the respective views of each camera 121. For example, in some embodiments, a first camera 121 may capture image data of the location 120 and automatically detect the area including, e.g., key points within the area (e.g., of landmarks and/or features of the area). In some embodiments, the first camera 121 may communicate data regarding the detected area and key points (e.g., a distance, an angle, etc. of the area with respect to the first camera 121) to a second camera 121. In some embodiments, the second camera 121 may automatically adjust its view to capture the same area in image data via detection of the key points and matching spatial locations to the key points in the image data of the first camera 121.

In some embodiments, interconnected cameras 121 in the location 120 may further make coordinated adjustments upon detection of a slippery condition. In some embodiments, where a slippery condition is detected, such as a puddle, liquid or oil spill, ice, or other slippery condition or combination thereof, the camera 121 for which the slippery condition has been detected by automatically detect a spatial location of the slippery condition in the area. For example, in some embodiments, the camera 121 may identify one or more key points and/or boundaries of the area and determine relative location of the slippery condition in the area. In some embodiments, the relative location and the key points and/or boundaries may be provided to a second camera 121. The second camera 121 may then automatically adjust orientation and/or zoom to capture the slippery condition based on the location and the key points and/or boundaries from the first camera 121. The second camera 121 may then capture image data of the area, including, e.g., additional key points and/or boundaries, a slippery condition or lack thereof, among other image data, and communicate the image data back to the first camera 121. In some embodiments, the first camera 121 may then readjust orientation and/or zoom based on image data from the second camera 121. In some embodiments, the first and second cameras 121 may iteratively adjust orientation and/or zoom based on a two-way exchange of data to capture common areas and/or features of the location 120. In some embodiments, the slippery condition detection system 110 may instruct the first and second cameras 121, as well as any other cameras 121 in the location 120 to adjust orientation and/or zoom based on the image communicated amongst the cameras 121.

In some embodiments, the slippery condition detection system 110 may perform the processing to determine the key points, features, boundaries, area, slippery condition and/or any other items in the image data to determine the adjustments to orientation and/or zoom for each camera 121. The adjustments may then be sent to each camera 121 as an instruction to cause each camera 121 to make the determined adjustments.

In some embodiments, each camera 121 may provide image data 101, such as, e.g., image frames, periodic images, a continuous video feed, periodic video segments, or other form of image data 101. In some embodiments, the periodic images may be received on a periodic basis at predetermined intervals, such as, e.g., every 5 seconds, every 10 seconds, every 15 seconds, every 20 seconds, every 25 seconds, every 30 seconds, every 45 seconds, every minute, every 2 minutes, every 5 minutes, every 10 minutes, or other suitable interval. Similarly, the periodic video segments may include a video segment on a periodic basis at predetermined intervals, such as, e.g., every 5 seconds, every 10 seconds, every 15 seconds, every 20 seconds, every 25 seconds, every 30 seconds, every 45 seconds, every minute, every 2 minutes, every 5 minutes, every 10 minutes, or other suitable interval. Accordingly, in some embodiments, each camera 121 may include, e.g., a digital camera, image sensor, charge-coupled device (CCD), video camera, or other suitable image capturing device.

In some embodiments, the cameras 121 may include or be in connection with one or more sensor device(s) 122. For example, each camera 121 may include an integrated sensor device 122, an external wired sensor device 122, an external wireless sensor device 122 or any other suitable arrangement of a camera 121 with a sensor device 122. In some embodiments, the sensor device 122 may include a suitable sensor device 122 for facilitating adjustment and control of each camera 121. In some embodiments, the sensor device 122 may include, e.g., at least one particular light sensor. In some embodiments, the particular light sensor measures a light intensity of a light (e.g., sunlight, electrical lighting, ambient lighting, fire, etc.) in a particular area of the enclosure where a particular camera 121 is positioned. In some embodiments, using the light intensity, each camera 121 may automatically turn on or turn off. For example, where the light intensity of the light in the particular area of the enclosure is equal to or exceeds a predetermined threshold value corresponding a sufficient amount of light intensity to recognize a particular slippery condition on the floor, the associated cameras 121 may turn on and capture one or more images of the location 120. Similarly, where the light intensity falls below the predetermined threshold value, the associated camera(s) 121 may automatically turn off. In some embodiments, communicating and processing images can use substantial computational resources, and the visibility of slippery conditions may be unreliable in low light conditions. Thus, by using the light sensor, computational resources can be conserved for more efficient slippery condition detection by limiting imaging, communication of image data 101 and processing of the image data 101 to when lighting is sufficient for viewing slippery conditions.

In some embodiments, the predetermined threshold value of the light intensity may include, e.g., 1 milli-candela per meter squared ($mcd/m^2$), 1.4 $mcd/m^2$, 5 $mcd/m^2$, 40 $mcd/m^2$, 2 candela per meter squared ($cd/m^2$), 5 $cd/m^2$, 25 $cd/m^2$, 30 $cd/m^2$, 55 $cd/m^2$, 80 $cd/m^2$, 250 $cd/m^2$, 700 $cd/m^2$, 2 kilo-candela per meter squared ($kcd/m^2$), 2.5 $kcd/m^2$, 5 $kcd/m^2$, 7 $kcd/m^2$, 10 $kcd/m^2$, 12 $kcd/m^2$, or greater luminance of the location 120.

In some embodiments, alternatively or additionally, the camera(s) 121 associated with a particular light sensor may adjust operation based on the light intensity detected by the light sensor. For example, in some embodiments, the camera(s) 121 may scale, e.g., aperture, exposure time, International Organization for Standardization (ISO) speed, or any other suitable image capturing parameter or any suitable combination thereof. Additionally, or alternatively, the light sensor may be employed to adjust operation of a light source 124. For example, where light intensity falls below the predetermined value, the light sensor may trigger the light source 124 to activate and/or increase in brightness. Similarly, where the light intensity exceeds a second predetermined threshold value, the light sensor may trigger the light source 124 to deactivate and/or decrease in brightness. In some embodiments, the light source 124 may automatically scale in brightness in response to the light intensity detected by the light sensor.

In some embodiments, instead of or in addition to the light sensor, light intensity in the location 120 may be determined based on captured image data from one or more cameras 121 of the cameras 121 in the location 120. In some embodiments, for example, a pixel intensity of one or more pixels may be determined based on pixel values of a captured image. In some embodiments, the light intensity of the location 120 may be determined based on, e.g., an average pixel intensity across all pixels in a given image, a summed pixel intensity across all pixels in a given image, a peak pixel intensity across all pixels in a given image, a sample average pixel intensity across a sample of pixels in a given image, a sample sum pixel intensity across a sample of pixels in a given image, a peak sample average pixel intensity of a highest average pixel intensity between all samples of pixels in a given image, a peak sample sum pixel intensity of a highest sum of pixel intensity between all samples of pixels in a given image, or any other suitable methodology for determine light intensity in the location 120 based on pixel values of each image captured.

In some embodiments, the sensor device 122 may include any other suitable sensor device for adjusting the operation of the cameras 121, such as, e.g., a motion detection sensor. In some embodiments, the cameras 121 may be employed for detection of the slippery condition, as well as for detection of actual slips and/or non-slips of passersby. In capturing the slip or non-slip of a person moving through the location 120, the cameras 121 may provide image data 101 regarding whether a surface is slippery, whether a person has slipped, or other information to help determine and/or validate and/or invalidate a detection of a slippery conditions. Accordingly, in some embodiments, a motion detection sensor may be employed to trigger activation of the cameras upon detection of motion.

In some embodiments, the image data 101 captured by the cameras 121 may be communicated to the slippery condition detection system 110 directly (via wireless and/or wired connection(s)) and/or via one or more communication beacons 123. In some embodiments, the communication beacon 123 may include, e.g., a WiFi router, a WiFi access point, a Bluetooth radio, a Zigbee access point, a Z-Wave access point, or any other suitable wireless beacon or any combination thereof. In some embodiments, the communication beacon 123 may include, e.g., one or more wired connections, such as, e.g., ethernet, fiber optic, universal serial bus (USB), or other suitable wired communication or any combination thereof.

In some embodiments, the communication beacon 123 may communicate with the slippery condition detection system 110 via a direct and/or networked connection. In some embodiments, the network may include any suitable computer network, including, two or more computers including the communication beacon 123 and the slippery condition detection system 110 and/or other computer devices that are connected with one another for the purpose of communicating data electronically. In some embodiments, the network may include a suitable network type, such as, e.g., a local-area network (LAN), a wide-area network (WAN) or other suitable type. In some embodiments, a LAN may connect computers and peripheral devices in a physical area, such as a business office, laboratory, or college campus, by means of links (wires, Ethernet cables, fiber optics, wireless such as Wi-Fi, etc.) that transmit data. In some embodiments, a LAN may include two or more personal computers, printers, and high-capacity disk-storage devices called file servers, which enable each computer on the network to access a common set of files. LAN operating system software, which interprets input and instructs networked devices, may enable communication between devices to share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, or other wide-area connection means. In some embodiments, an example of a WAN may include the Internet.

In some embodiments, the slippery condition detection system 110 may receive the image data 101 for automated detection of slippery conditions in each image of the location 120 provided by each camera 121. In some embodiments, the slippery condition detection system 110 may be a part of the user device 140. Thus, the slippery condition detection system 110 may include hardware and software components including, e.g., user device 140 hardware and software, cloud or server hardware and software, or a combination thereof.

In some embodiments, the slippery condition detection system 110 may include hardware components such as a processor 112, which may include local or remote processing components. In some embodiments, the processor 112 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 112 may include data-processing capacity provided by the microprocessor. In some embodiments, the microprocessor may include memory, processing, interface resources, controllers, and counters. In some embodiments, the microprocessor may also include one or more programs stored in memory.

In some embodiments, the slippery condition detection system 110 may include one or more computer devices implemented as a local or on-premises computing system, a cloud computing system or hybrid cloud computing system having one or more hardware and/or software components located in a cloud computing system and one or more hardware and/or software components located in a local computing system. In some embodiments, "cloud," "Internet cloud," "cloud computing," "cloud architecture," and similar terms may include at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

Similarly, the slippery condition detection system 110 may include storage 111, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage 111 may include, e.g., a suitable non-transient computer readable medium such as, e.g., random access memory (RAM), read only memory (ROM), one or more buffers and/or caches, among other memory devices or any combination thereof.

In some embodiments, the slippery condition detection system 110 may implement computer engines for detection of slippery conditions on a surface in the location 120 and provide an alert to user devices 140 to warn of slippery conditions. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the slippery condition detection system 110 may include computer engines including, e.g., a slippery condition detection engine 116 and a slip risk ranking engine 117. In some embodiments, the slippery condition detection engine 116 and/or the slip risk ranking engine 117 may each include dedicated and/or shared software components, hardware components, or a combination thereof. For example, the slippery condition detection engine 116 and the slip risk ranking engine 117 may each include a dedicated processor and storage. However, in some embodiments, the slippery condition detection engine 116 and/or the slip risk ranking engine 117 may share hardware resources, including the processor 112 and storage 111 of the slippery condition detection system 110 via, e.g., a bus 113.

In some embodiments, the slippery condition detection engine 116 implements a slippery condition detection machine learning algorithm to process the image data 101 and detect slippery conditions in the location 120 according to the process illustrated in FIG. 1B. In some embodiments, the slippery condition detection machine learning algorithm may iteratively ingest each image frame in the image data 101 to identify in each image frame features associated with a slippery condition. To do so, in some embodiments, for each image frame, the slippery condition detection machine learning algorithm may apply model parameters to pixel values of each image frame to output one or more labels for regions within each image frame according to whether each region includes a slippery condition or does not include a slippery condition. In some embodiments, the slippery condition detection engine 116 may receive, ingest, access or otherwise intake one or more image frames of the image data 101 on a periodic basis, such as, e.g., every 5 minutes, every 10 minutes, every 15 minutes, every 20 minutes, every 25 minutes, every 30 minutes, every 45 minutes, every 60 minutes, every two hours, every three hours, or other suitable period. In some embodiments, the slippery condition detection engine 116 may receive, ingest, access or otherwise intake one or more image frames of the image data 101 on a continual basis, e.g., as a stream of image frames from the cameras 121, e.g., in real-time or on a delay. In some embodiments, the slippery condition detection engine 116 may only process the image data 101 when, according to data in the image data 101 from the sensor device 122, the light intensity exceeds the predetermined threshold value and/or when motion is detected.

Accordingly, in some embodiments, the slippery condition detection machine learning algorithm may iteratively receive an image frame from each camera 121 to process the image frame of each camera 121 in conjunction, e.g., concurrently or consecutively for a particular time stamp of data. In some embodiments, for each time period of image data 101, the image data 101 may provide multiple floor visual inputs from the cameras 121 that capture one or more particular areas of the floor in the location 120 from at least two different angles.

In some embodiments, based on the multiple floor visual inputs from the image data 101, the slippery condition detection machine learning algorithm may process a combined visual input of the plurality of floor visual inputs to classify each particular area of the floor. As a result of the processing, the slippery condition detection machine learning model may implement model parameters that cause the slippery condition detection machine learning model to classify each particular area of the floor as, e.g., having a slippery condition or not having a slippery condition. As a result, the slippery condition detection engine 116 may place each image frame of the image data 101 in a slippery condition category or a non-slippery condition category based on the label of each floor visual input.

In some embodiments, the slippery condition detection engine 116 may be configured to utilize the slippery condition detection machine learning algorithm including one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
 b. transfer the input data to the exemplary neural network model,
 c. train the exemplary model incrementally,
 d. determine the accuracy for a specific number of timesteps,
 e. apply the exemplary trained model to process the newly-received input data,
 f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, based on the category and/or label of the visual input of the image data 101, the slippery condition detection engine 116 may iteratively store the particular images categorized in the slippery condition category into a slippery condition database 114 of floor visual inputs. For example, where the slippery condition detection machine learning algorithm produces a label for a particular visual input including a slippery condition, the particular visual input may be placed in the slippery condition category and stored in the slippery condition database 114 of the storage 111.

Similarly, in some embodiments, based on the category and/or label of the visual input of the image data 101, the slippery condition detection engine 116 may iteratively store the particular images categorized in the non-slippery condition category into a non-slippery condition database 115 of floor visual inputs. For example, where the slippery condition detection machine learning algorithm produces a label for a particular visual input including a non-slippery condition, the particular visual input may be placed in the non-slippery condition category and stored in the non-slippery condition database 115 of the storage 111.

In some embodiments, persistent and long term record keeping of potential slippery conditions may be advantageous and/or desired, e.g., for future risk, insurability, compensation, model training, or other use or any combination thereof. Accordingly, in some embodiments, one or both of the slippery condition database 114 and/or the non-slippery condition database 115 may include, e.g., a distributed ledger system, such as, e.g., blockchain. Accordingly, in some embodiments, the storage 111 may include or may be configured to interact and/or to store the image data for the slippery condition category and/or the non-slippery condition category visual inputs in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices are configured to utilize smart contracts that are computer processes that facilitate, verify and/or enforce the entry of and access to the slippery condition category and/or the non-slippery condition category by users. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, the non-slippery condition category and the non-slippery condition category may be stored on the same blockchain, on different blockchains or any combination thereof.

In some embodiments, the slippery condition detection engine 116 may additionally employ a motion recognition machine learning model. In some embodiments, where the sensor device 122 includes a motion detection sensor, the image data 101 may include one or more tags on one or more image frames of the visual input where the motion detection sensor detects motion. In some embodiments, the tag may cause the slippery condition detection engine 116 to process the tagged image frames that are in the slippery condition category with the motion recognition machine learning model. In some embodiments, the motion recognition machine learning model may receive each image frame of the visual input and process the image frames as a sequence with a suitable movement recognition model, such as, e.g., a recurrent neural network or other suitable neural network from processing time-series data. The motion recognition machine learning model may then detect any slippery condition-related negative movement events and generate a metric that is related to each slippery condition-related negative movement event. In some embodiments, slippery condition-related negative movement events may include, e.g., slips, trips, falls or other movements or any combination thereof.

In some embodiments, the motion recognition machine learning model ingest each image frame of the visual input and process each image frame to detect one or more body parts of a person. In some embodiments, the motion recognition machine learning model may track each body part through time by detecting the one or more body parts through successive image frames of the visual input. In some embodiments, the motion recognition machine learning model may employ a suitable neural network for object detection, recognition and/or tracking in the visual input, such as, e.g., MoveNet, or other suitable neural network.

In some embodiments, the motion recognition machine learning model may detect and track body posture via multiple key points on the body, such as, e.g., 10, 12, 15, 17, 20, 22, 25 or more key points. In some embodiments, one of the key points may include, e.g., a neck point marking a location in an image frame of the neck of the body, and an ankle point marking a location in the image frame of the ankle of the body.

In some embodiments, the motion recognition machine learning model may create a bounding box of the body around the body in each image frame. In some embodiments, the bounding box may be defined by a width and a height within each image frame, where the height is defined by a highest point of the body within a vertical axis of the image frame and a lowest point of the body within the vertical axis of the image frame, and where the width is defined by a left-most point of the body within a horizontal axis of the image frame and a right-most point of the body within the horizonal axis of the image frame.

In some embodiments, the motion recognition machine learning model may track a height of the neck and the ankle points in the vertical axis across image frames of the visual input, and may track the height and the width of the bounding box across the image frames. If at any image frame the vertical distance of neck point is located below half of a moving average of the vertical distance of the neck point, a label of a fall may be applied to the image frame. In some embodiments, to avoid false positives and incorporate different types of slips, trips and/or falls, the motion recognition machine learning model may also compare the width of the bounding box of the person in the image frame labeled with the fall, and if the width is larger than the height, then the probability of the slip, trip and/or fall event increases and thus the label of the fall is verified. In some embodiments, other suitable methodologies may be applied to detect slippery condition-related negative movement events such as slips, trips, falls or other movements or any combination thereof.

In some embodiments, the slippery condition-related negative movement event may include any movement caused by a slippery condition by a person in the area labeled as having a slippery condition. Thus, the slippery condition-related negative movement event may include, e.g., a slip, a fall, a slide, or other suitable the slippery condition-related negative movement event. In some embodiments, persistent and long term record keeping of slippery condition-related negative movement events may be advantageous and/or desired, e.g., for future risk, insurability, compensation, model training, or other use or any combination thereof. Accordingly, in some embodiments, the detected slippery condition-related negative movement event may be stored in the slippery condition database 114 in association (e.g., linked to) the contemporaneous slippery condition category visual input of the particular location 120 at the time of the slippery condition-related negative movement event. In some embodiments, the slippery condition-related negative movement event may be entered onto the blockchain associated with the slippery condition database 114 described above, on a different blockchain, on a separate database or any combination thereof.

In some embodiments, upon detecting a slippery condition in the location 120 and/or a slippery condition-related negative movement event, the slippery condition detection engine 116 may produce an instruction regarding the presence or absence of a slippery condition in the location 120. In some embodiments, the slippery condition detection engine 116 may produce the instruction upon each visual input being processed. Thus, the slippery condition detection engine 116 may iteratively instruct the beacon 123 to transmit, to the user device 140 associated with at least one user, at least one instruction 102 to display on a graphical user interface of the user device 140. In some embodiments, the instruction 102 include an indication of an interface element including an image of each particular area within the location 120 of each slippery condition detected, and an interface element requesting the at least one user to confirm a presence or an absence of each slippery condition at the location 120 of each particular area of the floor. In some embodiments, the user may include, e.g., a manager of a workplace to allow the manager to remove and/or instruct others to remove the slippery condition, provide feedback on the instruction, or take any other suitable action. In some embodiments, the user may also include any users within a range of the beacon 123 and/or registered as being in the location 120 to alert users in the area near the puddle and give them alerts. There's also a potential use of capturing any slips/falls that occur on the detected puddle before it's cleaned up which would inform statistics on what occurs if no action is taken to remove the puddle.

In some embodiments, the slippery condition detection system 110 may provide the instruction 102 to one or more cameras 121 in the location 120. In some embodiments, based on the detected slippery condition, the slippery condition detection system 110 produce the instruction 102 including one or more adjustments to orientation and/or zoom for each camera 121. The instruction 102 may then be sent to each camera 121 to cause each camera 121 to make the determined adjustments.

In some embodiments, the user device 170 may display to the user the interface elements and enable the user to provide feedback via selection regarding the presence of the absence of each detected slippery condition according to the displayed image and/or the user's awareness of the conditions of the floor in the location 120. In some embodiments, in response, the user may provide user feedback input 103 to one or more of the interface elements via selection. In some embodiments, the beacon 123 may relay the user feedback input 103 back to the slippery condition detection system 110 to validate and/or correct the categorization of an associated visual input associated with each user feedback input 103, and/or to validate and/or invalidate the slippery condition detection machine learning model. Thus, the slippery condition detection engine 116 may iteratively receive a plurality of user feedback inputs 103 identifying the presence or the absence of each slippery condition at each predicted location 120 of each particular area of the floor. The slippery condition detection engine 116 may then employ each user feedback input 103 as ground truth data for training the slippery condition detection machine learning model. Accordingly, the slippery condition detection engine 116 may iteratively train the slippery condition detection machine learning algorithm to obtain a trained slippery condition detection machine learning algorithm, based at least in part on the slippery condition database of floor visual inputs, the non-slippery condition database of floor visual inputs, and the feedback inputs 103 identifying the presence or the absence of each slippery condition at each predicted location 120 of each particular area of the floor.

In some embodiments, the slippery condition detection machine learning algorithm ingests a feature vector that encodes features representative of each visual input of the views of each camera 121. In some embodiments, the slippery condition detection machine learning algorithm processes the feature vector with parameters to produces a prediction of the presence or absence of a slippery condition. In some embodiments, the parameters of the slippery condition detection machine learning algorithm may be implemented in a suitable machine learning model including a classifier machine learning model, such as, e.g., a Region Proposals (R-CNN, Fast R-CNN, Faster R-CNN, cascade R-CNN), Single Shot MultiBox Detector (SSD), You Only Look Once (YOLO), Single-Shot Refinement Neural Network for Object Detection (RefineDet), Retina-Net, Deformable convolutional networks or any other suitable algorithm for a classification model. In some embodiments, for computational efficiency while preserving accuracy of predictions, the slippery condition detection machine learning algorithm may advantageously include a random forest classification model.

In some embodiments, the slippery condition detection machine learning algorithm processes the features encoded in the feature vector by applying the parameters of the classifier machine learning model to produce a model output vector. In some embodiments, the model output vector may be decoded to generate one or more labels indicative of the presence or absence of a slippery condition. In some embodiments, the model output vector may include or may be decoded to reveal a numerical output, e.g., one or more probability values between 0 and 1 where each probability value indicates a degree of probability that a particular label correctly classifies the visual input of the image data 101. In some embodiments, the slippery condition detection machine learning algorithm may test each probability value against a respective probability threshold. In some embodiments, each probability value has an independently learned and/or configured probability threshold. Alternatively, or additionally, in some embodiments, one or more of the probability values of the model output vector may share a common probability threshold. In some embodiments, where a probability value is greater than the corresponding probability threshold, the visual input of the image data 101 is labeled according to the corresponding label. For example, the probability threshold can be, e.g., greater than 0.5, greater than 0.6, greater than 0.7, greater than 0.8, greater than 0.9, or other suitable threshold value. Therefore, in some embodiments, the slippery condition detection machine learning algorithm may produce the presence or absence of a slippery condition for a particular visual input of the image data 101 based on the probability value(s) of the model output vector and the probability threshold(s).

In some embodiments, the parameters of the slippery condition detection machine learning algorithm may be trained based on known outputs. For example, the visual input of the image data 101 may be paired with a target classification or known classification to form a training pair, such as a historical visual input of the image data 101 and an observed result and/or human annotated classification denoting whether the historical visual input of the image data 101 include the presence or the absence of a slippery condition. In some embodiments, the visual input of the image data 101 may be provided to the slippery condition detection machine learning algorithm, e.g., encoded in a feature vector, to produce a predicted label. In some embodiments, an optimizer associated with the slippery condition detection machine learning algorithm may then compare the predicted label with the known output of a training pair including the historical visual input of the image data 101 to determine an error of the predicted label. In some embodiments, the optimizer may employ a loss function, such as, e.g., Hinge Loss, Multi-class SVM Loss, Cross Entropy Loss, Negative Log Likelihood, or other suitable classification loss function to determine the error of the predicted label based on the known output.

In some embodiments, the known output may be obtained after the slippery condition detection machine learning algorithm produces the prediction, such as in online learning scenarios. In such a scenario, the slippery condition detection machine learning algorithm may receive the visual input of the image data 101 and generate the model output vector to produce a label classifying the visual input of the image data 101. Subsequently, a user may provide feedback by, e.g., modifying, adjusting, removing, and/or verifying the label via a suitable feedback mechanism, such as a user interface device (e.g., keyboard, mouse, touch screen, user interface, or other interface mechanism of a user device or any suitable combination thereof). The feedback may be paired with the visual input of the image data 101 to form the training pair and the optimizer may determine an error of the predicted label using the feedback.

In some embodiments, based on the error, the optimizer may update the parameters of the slippery condition detection machine learning algorithm using a suitable training algorithm such as, e.g., backpropagation for a classifier machine learning model. In some embodiments, backpropagation may include any suitable minimization algorithm such as a gradient method of the loss function with respect to the weights of the classifier machine learning model. Examples of suitable gradient methods include, e.g., stochastic gradient descent, batch gradient descent, mini-batch gradient descent, or other suitable gradient descent technique. As a result, the optimizer may update the parameters of the slippery condition detection machine learning algorithm based on the error of predicted labels in order to train the slippery condition detection machine learning algorithm to model the correlation between visual input of the image data 101 and the presence or absence of a slippery condition in order to produce more accurate labels of visual input of the image data 101.

In some embodiments, the slippery condition category visual inputs may also be ranked according to slip risk. Accordingly, in some embodiments, the slippery condition detection system 110 implement the slip risk ranking engine 117 to rank the slippery condition category visual inputs in the slippery condition database 114 for a particular time period (e.g., a current time period according to a most recent image data 101 from the location 120). Thus, in some embodiments, the slip risk ranking engine 117 may determine an extent of each slippery condition based at least in part on pixel intensity of pixels found within at least one part of the visual input labeled with the slippery condition. In some embodiments, based on the extent of each slippery condition, each visual input of the location 120 is ranked to generate a ranked list of predicted slippery condition locations. In some embodiments, the ranked list may be included in the instruction 102 when the beacon 123 is instruction to transmit the instruction 102 to the user device 140.

Figure 2:
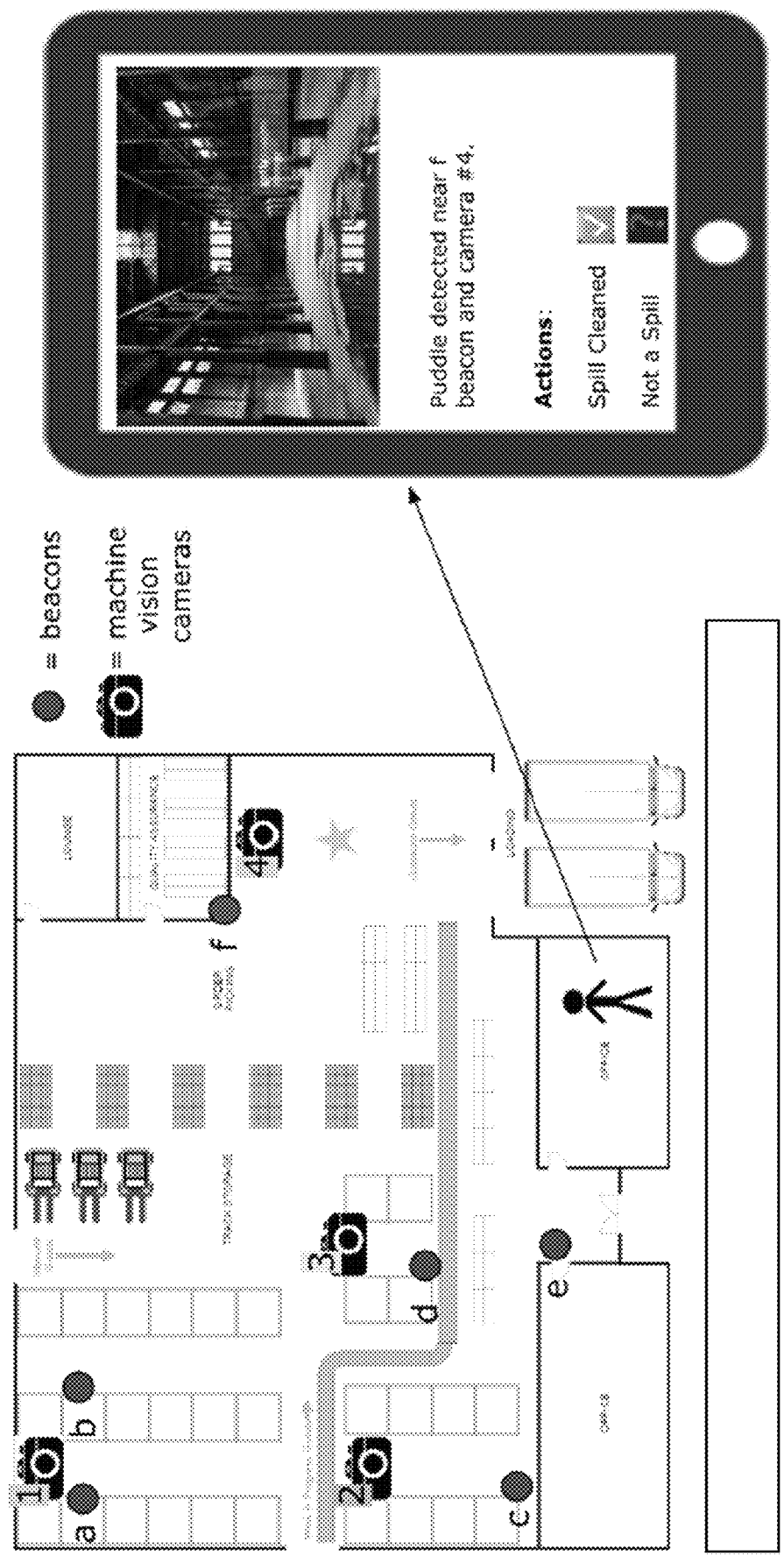
FIG. 2 illustrates an exemplary computer-based system and platform automated machine learning-based slip risk conditions using image data in an enclosure including a warehouse for alerting one or more users in accordance with one or more embodiments of the present disclosure.

FIG. 2 illustrates an exemplary computer-based system and platform automated machine learning-based slip risk conditions using image data in an enclosure including a warehouse for alerting one or more users in accordance with one or more embodiments of the present disclosure. In some embodiments, the warehouse may include multiple locations: a, b, c, d, e and f. The locations a, b, c, d, e and f may be within the view of multiple cameras 1, 2, 3 and 4 to provide imagery of each location a, b, c, d, e and f from different angles. Based on the detection of slippery conditions, e.g., at location f by camera 4, a user may be provided with a graphical user interface including the image with the detected slippery condition including a spill and a user selectable action to indicate the spill is "cleaned" and/or "not a spill".

Figure 3:
FIG. 3 depicts an example image frame with a wet floor and classification of the wet floor in detection of slip risk conditions in accordance with one or more embodiments of the present disclosure.
Figure 3:

FIG. 3 depicts an example image frame with a wet floor (a) and classification of the wet floor in detection of slip risk conditions (b) in accordance with one or more embodiments of the present disclosure. In some embodiments, the classification via labeling of the image frame as depicted in FIG. 3 may be output to a manager and/or one or more workers in a facility associated with the floor. With this output the manager and/or one or more works may provide feedback to the algorithm about the accuracy of the detected slip risk condition by verifying or disputing the label on the image frame.

FIG. 4 depicts an example image frames from different angles of a wet floor to illustrate the technical advantages of multiple camera angles in accordance with one or more embodiments of the present disclosure. In this example, a first angle (a) should a clearly visible spill, while a second angle (b) does not appear to show a spill due to lighting differences in the area of the floor of the location.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users and/or devices that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A system including:
   a plurality of cameras, positioned within an enclosure above a floor of the enclosure;
   a plurality of communication beacons, positioned within the enclosure;
   a first computing device, including:
      a non-transient computer memory, storing software instructions;
   at least one processor
   where, when the at least one processor executes the software instructions, the at least one processor is programmed to:
      iteratively receive, during a plurality of time periods, a plurality of floor visual inputs from the plurality of cameras, where the plurality of floor visual inputs includes each plurality of particular images capturing each particular area of the floor from at least two different angles;
      iteratively execute at least one slippery condition detection machine learning algorithm to process a combined visual input of the plurality of floor visual inputs to classify each particular area of the floor, associated with the plurality of particular images, into:
  a slippery condition category or
  a non-slippery condition category to form a non-slippery condition database of floor visual inputs;
iteratively store a plurality of particular images into a slippery condition database of floor visual inputs when a particular area of the floor, corresponding to the plurality of particular images, is classified into the slippery condition category;
iteratively store the plurality of particular images into a non-slippery condition database of floor visual inputs when the particular area of the floor, corresponding to the plurality of particular images, is classified into the non-slippery condition category;
for each particular area in the slippery condition category:
  iteratively label each predicted location of each slippery condition within each particular area of the floor within the plurality of floor visual inputs;
  iteratively instruct at least one beacon of the plurality of beacons to transmit, to at least one second computing device associated with at least one user, at least one instruction to display on the at least one second computing device a graphical user interface, including:
    at least one image of each particular area with each predicted location of each slippery condition and
    at least one graphical user element requesting the at least one user to confirm a presence or an absence of each slippery condition at each predicted location of each particular area of the floor;
  iteratively receive a plurality of user feedback inputs, identifying the presence or the absence of each slippery condition at each predicted location of each particular area of the floor; and
  iteratively train the at least one slippery condition detection machine learning algorithm to obtain at least one trained slippery condition detection machine learning algorithm, based at least in part on:
    the slippery condition database of floor visual inputs,
    the non-slippery condition database of floor visual inputs, and
    the plurality of feedback inputs, identifying the presence or the absence of each slippery condition at each predicted location of each particular area of the floor.

2. The system of clause 1, where each camera of the plurality of cameras is programed to adjust an operation of at least one light source so as to result in the light intensity of the light in the particular area of the enclosure that is equal to or exceeds the predetermined threshold value.

3. The system of clause 2, where the at least one light source is incorporated into a respective camera of the plurality of cameras.

4. The system of clause 1, where, when the at least one processor executes the software instructions, the at least one processor is further programmed to determine an extent of each slippery condition for each predicted location of each slippery condition within each particular area based at least in part on pixel intensity of pixels found within at least one part of the at least one image corresponding to each predicted location of each slippery condition in each particular area.

5. The system of clause 4, where, when the at least one processor executes the software instructions, the at least one processor is further programmed to rank each predicted location of each slippery condition based on the extent of the slippery condition to generate a ranked list of predicted slippery condition locations.

6. The system of clause 5, where, when the at least one processor executes the software instructions, the at least one processor is further programmed to iteratively instruct, based on the ranked list of predicted slippery condition locations, the at least one beacon of the plurality of beacons to transmit, to the at least one second computing device associated with the at least one user, the at least one instruction to display on the at least one second computing device the graphical user interface.

7. The system of clause 1, further including:
  at least one motion detection sensor;
  where each camera of the plurality of cameras is further programed to acquire the visual input when the at least one motion detection sensor has been activated;
  where, when the executes the software instructions, the at least one processor is further programmed to identify, from the visual input, at least one slippery condition-related negative movement event associated with at least one predicted location of at least one slippery condition at least one area of the floor; and
  generate at least one metric that is related to the at least one slippery condition-related negative movement event.

8. The system of clause 7, where the at least one slippery condition-related negative movement event is a slip.

9. The system of clause 7, where the at least one slippery condition-related negative movement event is a fall.

10. The system of clause 1, where the enclosure is a warehouse.

11. The system of clause 1, where each camera of the plurality of cameras includes at least one particular light sensor that is configured to measure a light intensity of a light in a particular area of the enclosure where a particular camera is positioned.

12. The system of clause 11, where each camera of the plurality of cameras is programed to acquire a visual input when the light intensity of the light in the particular area of the enclosure is equal to or exceeds a predetermined threshold value corresponding a sufficient amount of light intensity to recognize a particular slippery condition on the floor.

13. The system of clause 12, where, when the at least one processor executes the software instructions, the at least one processor is further programmed to:
  iteratively receive, during the plurality of time periods, the plurality of floor visual inputs from the plurality of cameras when the light intensity detected by each light sensor associated with each camera is of the sufficient amount to recognize a particular slippery condition on the floor.

14. The system of clause 1, where, when the at least one processor executes the software instructions, the at least one processor is further programmed to:
  determine at least one pixel intensity associated with at least one pixel of the plurality of floor visual inputs from the plurality of cameras; and
  iteratively receive, during the plurality of time periods, the plurality of floor visual inputs from the plurality of cameras when the light intensity detected by each light sensor associated with each camera is of the sufficient amount to recognize a particular slippery condition on the floor.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A system including:
a plurality of cameras, positioned within an enclosure above a floor of the enclosure;
a plurality of communication beacons, positioned within the enclosure;
a first computing device, including:
a non-transient computer memory, storing software instructions;
at least one processor, where, when the at least one processor executes the software instructions, the at least one processor is programmed to:
iteratively receive, during a plurality of time periods, a plurality of floor visual inputs from the plurality of cameras, where the plurality of floor visual inputs includes each plurality of particular images capturing each particular area of the floor from at least two different angles;
iteratively execute at least one slippery condition detection machine learning algorithm to process a combined visual input of the plurality of floor visual inputs to classify each particular area of the floor, associated with the plurality of particular images, into:
a slippery condition category or
a non-slippery condition category to form a non-slippery condition database of floor visual inputs;
iteratively store a plurality of particular images into a slippery condition database of floor visual inputs when a particular area of the floor, corresponding to the plurality of particular images, is classified into the slippery condition category;
iteratively store the plurality of particular images into a non-slippery condition database of floor visual inputs when the particular area of the floor, corresponding to the plurality of particular images, is classified into the non-slippery condition category;
for each particular area in the slippery condition category:
iteratively label each predicted location of each slippery condition within each particular area of the floor within the plurality of floor visual inputs;
iteratively instruct at least one beacon of the plurality of beacons to transmit, to at least one second computing device associated with at least one user, at least one instruction to display on the at least one second computing device a graphical user interface, including:
at least one image of each particular area with each predicted location of each slippery condition and
at least one graphical user element requesting the at least one user to confirm a presence or an absence of each slippery condition at each predicted location of each particular area of the floor;
iteratively receive a plurality of user feedback inputs, identifying the presence or the absence of each slippery condition at each predicted location of each particular area of the floor; and
iteratively train the at least one slippery condition detection machine learning algorithm to obtain at least one trained slippery condition detection machine learning algorithm, based at least in part on:
the slippery condition database of floor visual inputs,
the non-slippery condition database of floor visual inputs, and
the plurality of feedback inputs, identifying the presence or the absence of each slippery condition at each predicted location of each particular area of the floor.

2. The system of claim 1, where each camera of the plurality of cameras is programed to adjust an operation of at least one light source so as to result in the light intensity of the light in the particular area of the enclosure that is equal to or exceeds the predetermined threshold value.

3. The system of claim 2, where the at least one light source is incorporated into a respective camera of the plurality of cameras.

4. The system of claim 1, where, when the at least one processor executes the software instructions, the at least one processor is further programmed to determine an extent of each slippery condition for each predicted location of each slippery condition within each particular area based at least in part on pixel intensity of pixels found within at least one part of the at least one image corresponding to each predicted location of each slippery condition in each particular area.

5. The system of claim 4, where, when the at least one processor executes the software instructions, the at least one processor is further programmed to rank each predicted location of each slippery condition based on the extent of the slippery condition to generate a ranked list of predicted slippery condition locations.

6. The system of claim 5, where, when the at least one processor executes the software instructions, the at least one processor is further programmed to iteratively instruct, based on the ranked list of predicted slippery condition locations, the at least one beacon of the plurality of beacons to transmit, to the at least one second computing device associated with the at least one user, the at least one instruction to display on the at least one second computing device the graphical user interface.

7. The system of claim 1, further including:
at least one motion detection sensor;
where each camera of the plurality of cameras is further programed to acquire the visual input when the at least one motion detection sensor has been activated;
where, when the executes the software instructions, the at least one processor is further programmed to identify, from the visual input, at least one slippery condition-related negative movement event associated with at least one predicted location of at least one slippery condition at least one area of the floor; and generate at least one metric that is related to the at least one slippery condition-related negative movement event.

8. The system of claim 7, where the at least one slippery condition-related negative movement event is a slip.

9. The system of claim 7, where the at least one slippery condition-related negative movement event is a fall.

10. The system of claim 1, where the enclosure is a warehouse.

11. The system of claim 1, where each camera of the plurality of cameras includes at least one particular light sensor that is configured to measure a light intensity of a light in a particular area of the enclosure where a particular camera is positioned.

12. The system of claim 11, where each camera of the plurality of cameras is programed to acquire a visual input when the light intensity of the light in the particular area of the enclosure is equal to or exceeds a predetermined threshold value corresponding a sufficient amount of light intensity to recognize a particular slippery condition on the floor.

13. The system of claim 12, where, when the at least one processor executes the software instructions, the at least one processor is further programmed to:
iteratively receive, during the plurality of time periods, the plurality of floor visual inputs from the plurality of cameras when the light intensity detected by each light sensor associated with each camera is of the sufficient amount to recognize a particular slippery condition on the floor.

14. The system of claim 1, where, when the at least one processor executes the software instructions, the at least one processor is further programmed to:
determine at least one pixel intensity associated with at least one pixel of the plurality of floor visual inputs from the plurality of cameras; and
iteratively receive, during the plurality of time periods, the plurality of floor visual inputs from the plurality of cameras when the light intensity detected by each light sensor associated with each camera is of the sufficient amount to recognize a particular slippery condition on the floor.

15. A method comprising:
iteratively receiving, by a device, during a plurality of time periods, a plurality of floor visual inputs from the plurality of cameras, where the plurality of floor visual inputs includes each plurality of particular images capturing each particular area of the floor from at least two different angles;
iteratively executing, by the device, at least one slippery condition detection machine learning algorithm to process a combined visual input of the plurality of floor visual inputs to classify each particular area of the floor, associated with the plurality of particular images, into:
a slippery condition category, or
a non-slippery condition category to form a non-slippery condition database of floor visual inputs;
iteratively storing, by the device, a plurality of particular images into a slippery condition database of floor visual inputs when a particular area of the floor, corresponding to the plurality of particular images, is classified into the slippery condition category;
iteratively storing, by the device, the plurality of particular images into a non-slippery condition database of floor visual inputs when the particular area of the floor, corresponding to the plurality of particular images, is classified into the non-slippery condition category;
for each particular area in the slippery condition category:
iteratively labelling, by the device, each predicted location of each slippery condition within each particular area of the floor within the plurality of floor visual inputs;
iteratively instructing, by the device, at least one beacon of the plurality of beacons to transmit, to at least one second computing device associated with at least one user, at least one instruction to display on the at least one second computing device a graphical user interface, including:
at least one image of each particular area with each predicted location of each slippery condition, and
at least one graphical user element requesting the at least one user to confirm a presence or an absence of each slippery condition at each predicted location of each particular area of the floor;
iteratively receiving, by the device, a plurality of user feedback inputs, identifying the presence or the absence of each slippery condition at each predicted location of each particular area of the floor; and
iteratively training, by the device, the at least one slippery condition detection machine learning algorithm to obtain at least one trained slippery condition detection machine learning algorithm, based at least in part on:
the slippery condition database of floor visual inputs,
the non-slippery condition database of floor visual inputs, and
the plurality of feedback inputs, identifying the presence or the absence of each slippery condition at each predicted location of each particular area of the floor.

16. The method of claim 15, further comprising:
determining, by the device, an extent of each slippery condition for each predicted location of each slippery condition within each particular area based at least in part on pixel intensity of pixels found within at least one part of the at least one image corresponding to each predicted location of each slippery condition in each particular area.

17. The method of claim 15, further comprising:
ranking, by the device, each predicted location of each slippery condition based on the extent of the slippery condition to generate a ranked list of predicted slippery condition locations.

18. The method of claim 17, further comprising:
iteratively instructing, by the device, based on the ranked list of predicted slippery condition locations, the at least one beacon of the plurality of beacons to transmit, to the at least one second computing device associated with the at least one user, the at least one instruction to display on the at least one second computing device the graphical user interface.

19. The method of claim 15, further comprising:
acquiring, by the device, a visual input when a light intensity of a light in a particular area of the enclosure is equal to or exceeds a predetermined threshold value corresponding a sufficient amount of light intensity to recognize a particular slippery condition on the floor; and
iteratively receiving, by the device, during the plurality of time periods, the plurality of floor visual inputs from the plurality of cameras when the light intensity detected by each light sensor associated with each camera is of the sufficient amount to recognize a particular slippery condition on the floor.

20. The method of claim 15, further comprising:

determining, by the device, at least one pixel intensity associated with at least one pixel of the plurality of floor visual inputs from the plurality of cameras; and iteratively receiving, by the device, during the plurality of time periods, the plurality of floor visual inputs from the plurality of cameras when the light intensity detected by each light sensor associated with each camera is of the sufficient amount to recognize a particular slippery condition on the floor.

* * * * *